L. D. JONES.
VEHICLE SPRING.
APPLICATION FILED APR. 3, 1916.
1,270,953.
Patented July 2, 1918.
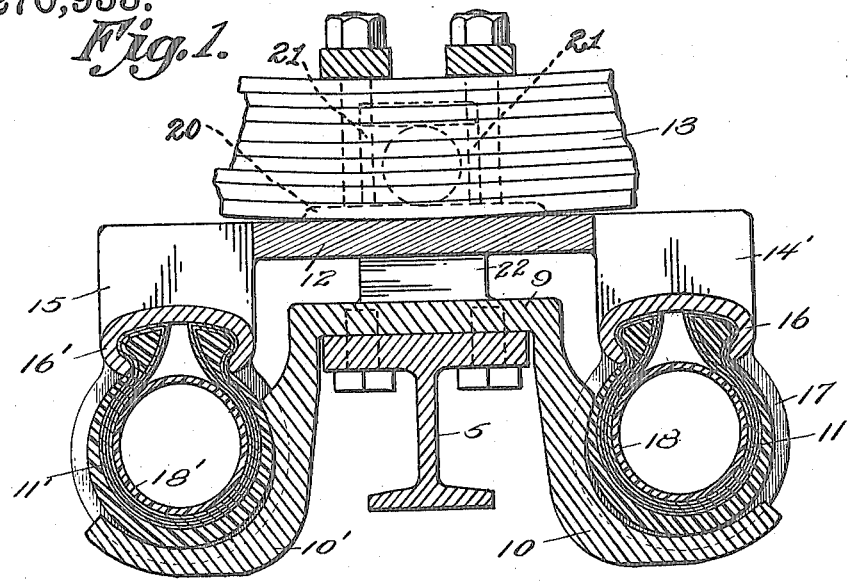
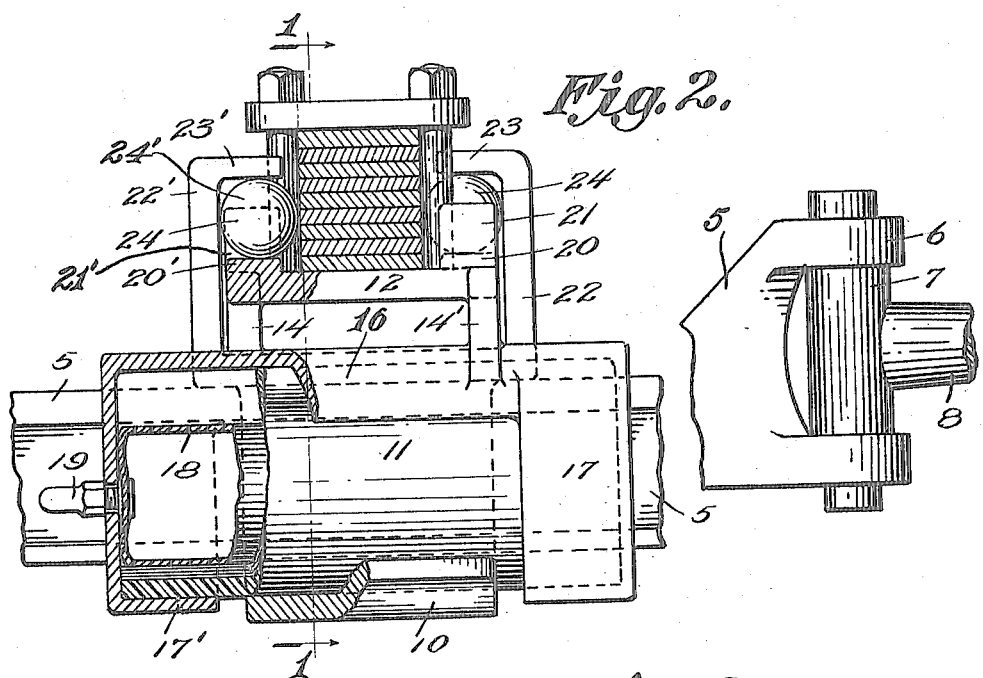
Attest:
Inventor: Lyman D. Jones
by ___ Atty.

UNITED STATES PATENT OFFICE.

LYMAN D. JONES, OF BRIDGEPORT, CONNECTICUT.

VEHICLE-SPRING.

1,270,953.    Specification of Letters Patent.    Patented July 2, 1918.

Application filed April 3, 1916. Serial No. 88,453.

*To all whom it may concern:*

Be it known that I, LYMAN D. JONES, a citizen of the United States, and a resident of the city of Bridgeport, county of Fairfield, and State of Connecticut, have invented certain new and useful Improvements in Vehicle-Springs, of which the following is a specification.

This invention relates to vehicles, especially self-propelled vehicles, with more particular reference to cushioning means adapted to be interposed between body and running gear to take up and minimize the effects of shocks and jars due to uneven road surfaces and to the sudden starting and stopping of the vehicle. The present invention is not so much designed to supplant either pneumatic tires or what are known as shock-absorbers—although the combined effect of both of the latter is believed to be attainable with the device of my invention when applied to vehicles having solid tires and not equipped with present known types of so-called shock-absorbers—it being preferred by me to employ my cushioning means in connection with pneumatic tires in order to still further enhance the steady and "easy-running" qualities of the vehicle when in motion.

My invention will be more readily understood by reference to the accompanying drawings, forming a part of this specification, in which—

Figure 1 is a sectional view of the axle and body-supporting means of a vehicle with cushioning means embodying my invention applied thereto, taken substantially on the line 1—1 of Fig. 2, and Fig. 2 is a side or front view thereof, partly in section and partly broken away.

Referring now to the drawings in detail, numeral 5 designates the front axle of a vehicle, preferably in the usual form of an I-beam, as shown, each end of which is provided with bearings 6 for the knuckle 7 carrying the usual cone-shaped bearing 8 upon which one of the front wheels is mounted. It is to be understood, of course, as will subsequently appear, that the device of my invention is equally applicable to the rear axle.

Bolted to the axle 5, near each end thereof, is an integral frame 9, preferably a metal casting, which includes the two opposite depending side portions 10 and 10′ each shaped in such manner that an open pocket of substantially semi-cylindrical configuration is provided in the outer face thereof, of a size to receive and support a longitudinally straightened section of the shoe of an ordinary pneumatic tire as shown in the drawings, these shoe-sections 11 11′ being of what is known as the "clencher" type.

The body of the vehicle is designed to be supported upon a plate 12 through the interposition of the usual laminated vehicle spring 13. This plate 12 preferably forms a part of an integral frame which includes a pair of arms 14 and 14′ at one end thereof, and a corresponding pair of arms, 15 and its opposite counterpart (not shown), at the other end thereof. At the lower ends of the arms of each pair are carried the curved plates 16 and 16′, each of which is substantially of the configuration of a longitudinally straightened "clencher" rim of a vehicle wheel, being provided with inturned edges which constitute retaining pockets for the usual ribbed meeting edges of the tire-shoe section 11, and serve to insure retention of said section, when under the pressure of inflation, in precisely the same manner as an ordinary tire-shoe is retained in the usual clencher rim. At each end of the plate 16 is provided the cup-shaped retaining portions 17 and 17′, dimensioned to receive and snugly retain the ends of the tire-shoe section 11, and the plate 16′ is similarly equipped. Within the tire-shoe sections 11 and 11′ are the ordinary—although relatively shorter—inner tubes 18 and 18′, of the usual elastic material, such as soft rubber, each provided with the well-known valve and valve cap 19 to provide for inflation and deflation thereof. It will be apparent that on inflation of the so-called inner tube 18, the tire-shoe section 11 may be given the desired degree of resiliency to perform the functions hereinafter set forth.

The upper face of the plate 12 is further provided with the raised portions 20 and 20′ at opposite side edges thereof, projecting upwardly from which are corresponding pairs of retaining lugs 21 and 21′, the function of each of these pairs being to loosely retain in proper position upon each of said raised portions of the plate 12 a highly resilient spherical body 24, such as a rubber ball. Preferably integral with and projecting upwardly from the frame or member 9, are the arms 22 and 22′, the upper ends of which are provided with in-turned extensions 23 and 23', respectively, between which and the raised portions 20 and 20' of the plate 12, the resilient balls 24 are under compression.

A frame 9 is mounted near each end of each of the axles of the vehicle. It will therefore be apparent that the body of the vehicle, with its usual carriage springs 13, will be entirely supported upon the pneumatic cushions 11 interposed between said body and the axles. It will be noted that these cushions are transversely disposed with reference to the longitudinal axis of the vehicle, and the shocks or jars due to the abrupt starting or stopping of the vehicle are minimized by the yielding resistance of the cushions to distortion, making the consequential movement of the body more gradually accelerated or diminished. The same is true with respect to sudden lateral movements of the running gear. Similarly, the pneumatic cushions 11 yieldingly resist sudden vertical movements of the body with reference to the running gear when ruts or obstructions are encountered in the road.

However, in connection with sudden vertical movements of the running gear, the effect of the rebound of the cushion or spring is often found to be objectionable, and to minimize the effect of this rebound, I provide the resilient balls 24, compression of which is relieved by forces which tend to distort the cushions 11 in a vertical direction, and which yieldingly resist this "rebound" or the forces which tend to restore the cushions 11 to their natural or normal contours.

Modifications of many minor details of my improved vehicle spring will doubtless readily suggest themselves to those skilled in the art to which it appertains, and I therefore do not desire to limit my invention to the specific construction herein shown and described.

I claim—

1. In a device of the character described, the combination, with the axle of a vehicle, of relatively elongated pneumatic cushions carried thereby, said cushions being disposed parallel to said axle and arranged in pairs at each end thereof, a vehicle-body-supporting frame mounted on said cushions and being supported in such manner as to have both vertical and lateral movements relative to said axle, and means for yieldingly resisting the reactive forces of said cushions.

2. In a device of the character described, the combination, with the axle of a vehicle and supporting frame for the vehicle body, of a pair of relatively elongated pneumatic cushions carried at each end of and paralleling said axle and in substantially counterbalanced arrangement with reference thereto, said supporting frame being mounted on said cushions and being provided with means engaging the ends of said cushions.

3. In a device of the character described, the combination, with the axle of a vehicle and supporting frame for the vehicle body, of a pair of relatively elongated pneumatic cushions carried at each end of and paralleling said axle and in substantially counterbalanced arrangement with reference thereto, said supporting frame being mounted on said cushions and being provided with means engaging the ends of said cushions, and means for yieldingly resisting the reactive forces of said cushions.

In testimony of the foregoing, I have hereunto set my hand in the presence of two witnesses.

LYMAN D. JONES.

Witnesses:
H. R. CONWAY,
GOLDIE L. ECKSTEIN.

Copies of this patent may be obtained for five cents each, by addressing the "Commissioner of Patents, Washington, D. C."